United States Patent Office 3,732,089
Patented May 8, 1973

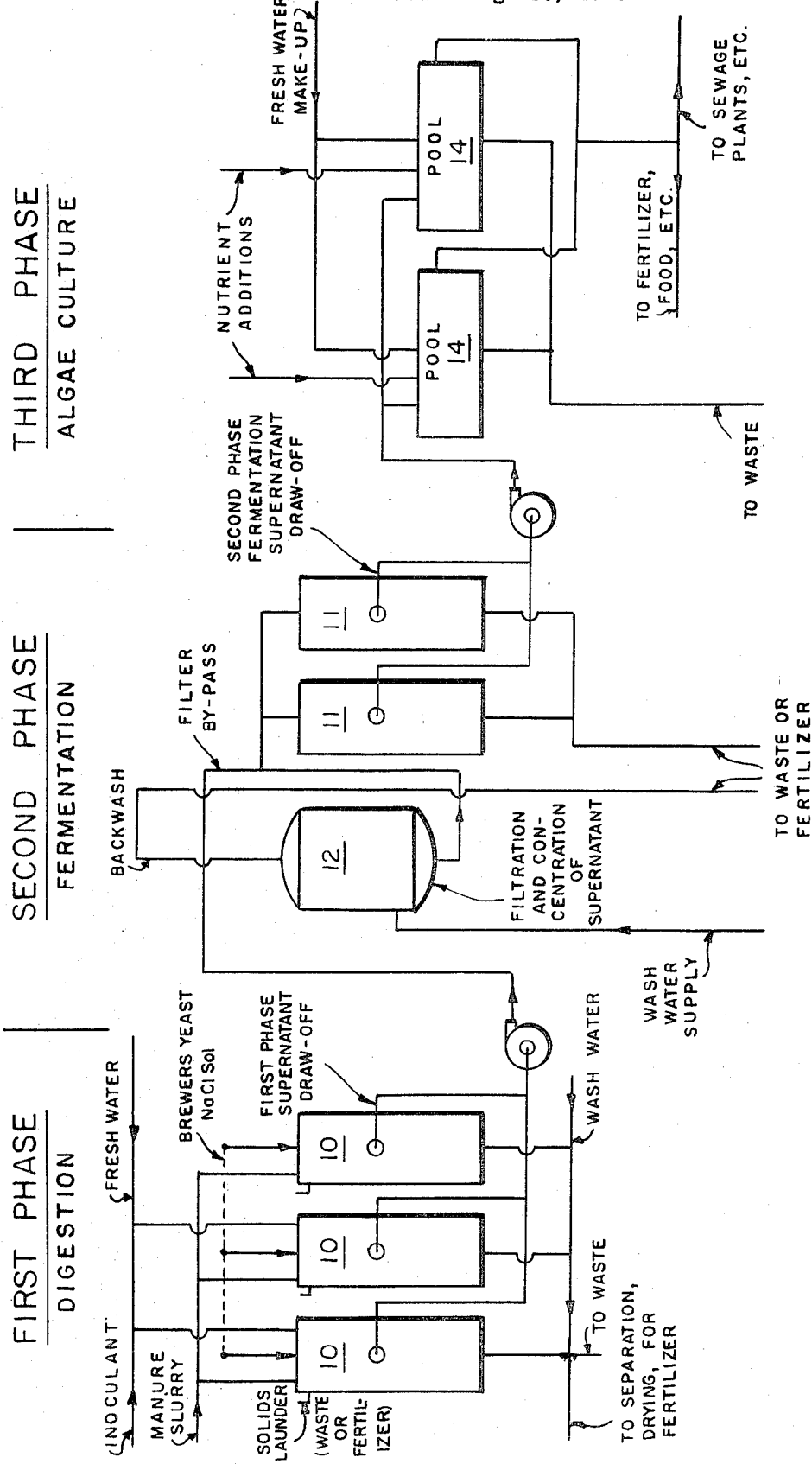

3,732,089
PROCESS FOR PRODUCING MICRO-ORGANISMS
Charles K. Megronigle, 1801 Baltimore Pike,
Springfield, Pa. 19064
Filed Aug. 16, 1971, Ser. No. 171,919
Int. Cl. C05f 11/08
U.S. Cl. 71—8
13 Claims

ABSTRACT OF THE DISCLOSURE

The processing of the excrement of lactating cows is disclosed having a digestion phase, a fermentation phase and an algae culture phase. In the digestion stage a slurry of excrement of lactating cows is reacted with brewer's yeast, sodium chloride, an inoculant and water to provide a first phase supernantant for use, separated from wastes, in the second phase. In the second or fermentation phase the first supernatant is filtered, concentrated and fermented, wastes separated, and a second supernatant drawn off for use in the third or algae culture stage. In the latter stage nutrients and fresh water are added to the second supernatant which is held in pools with withdrawal of the wastes and separation of a culture useful in the treatment of animal wastes, sewage and waste waters and products useful for a variety of purposes including reduction of odors, increased oxidation in sewage effluent, degreasing of sewer conduits and plant equipment, accelerated settlement of sewage solids, foaming reduction and control, nitrogen and phosphorous level reductions in sewage plant effluent, accelerated cellulose fiber degradation, organic soil additives, and animal feed supplement and/or additives.

BACKGROUND OF THE INVENTION

Field of the invention

The present invention relates to a process for producing micro-organisms in a batch or continuous symbiotic system utilizing the combined natural ecological relationships of algal-bacterial cultures for the treatment of animal wastes, sewage, waste water, and other uses beneficial to mankind.

DESCRIPTION OF THE PRIOR ART

It has heretofore been proposed by Wade, in U.S. Pat. No. 3,108,868 to prepare micro-organisms containing compositions from the excrement of pregnant cows but this is necessarily restricted in scope by reason of the limited number of pregnant cows as well as for other reasons.

Attaway, in U.S. Pat. No. 3,269,940 provides a bacteria activator for use in septic tanks but does not employ the exrement of lactating cows nor subject the sewage to any treatment comparable to that of the present invention.

Delarche, in U.S. Pat. No. 2,856,286, discloses methods and maerials having nutritive or biological value by treating with light free from ultra violet rays and at a temperature below 40 degrees C. water containing vegetable organisms from algae and lichens with additives including sugar and carbohydrate containing vegetable substances and by arrested fermentation obtaining a substance of the consistency of bread dough and further reacting that substance with lucern flour.

Melville, in U.S. Pat. No. 2,879,151, relates to the preparation of a liquid organic plant food derived from organic composted material made from dairy cattle manure reacted with brewer's dried yeast and fermented with liquid added for further controlled fermentation.

Makabe, in U.S. Pat. No. 3,219,576, discloses the treatment of night soil with certain bacteria of the genus Vibrio, the treatment requiring about forty-five days.

Moore, in U.S. Pat. No. 3,431,675, discloses methods of converting saline and brackish waters into water suitable for human consumption which utilizes certain micro-organisms derived from animal excreta including ruminant animals, with algae.

Martin, in U.S. Pat. No. 2,908,113, shows a process for producing micro-organisms and soil conditioners employing excrement from milking cows, water, yeast, with a culture derived from sea water.

SUMMARY OF THE INVENTION

In accordance with the invention, a method of processing the excrement of lactating cows is provided in which the excrement is diluted with fresh water, and then inoculated with specific micro-organisms, nutrients and nutrient producing media are added to produce a rich liquid composition which is then introduced into a water solution into which certain strains of plant organisms are introduced to complete the culture, said culture having valuable properties in the treatment of animal wastes, sewage and waste waters and resulting in beneficial by-products, co-products and other uses beneficial to mankind.

It is an object of the present invention to provide a process or method using fresh cow manure, fresh water and certain strains of cellulose digesting bacteria to produce a rich liquid composition which is fed in a measured amount into a water solution containing strains of plant organisms, generally of the phylum or major division, Chlorophycophyta and mainly of the evolutionary line or genus Chlorella, these cultured for the purpose of producing a material or substance having valuable properties in the treatment of animal wastes, sewage, and waste waters, and the development of other products beneficial to animals and mankind.

It is an object of the present invention to provide a process or method using fresh cow manure, fresh water, and certain strains of cellulose digesting bacteria mainly of the aerobic faculative types falling in the Order Eubacteriales: specifically *Cellulobacillus myxogenes* and *Cellulobacillus mucosis* which do not normally occur in the digestive tract of ruminant animals but are introduced into the present process culture as enzyme producers; the peritrichously flagellated non-spore forming Cellulomonas; the spore forming Clostridia, *Cl. lochheadii* and *Cl. longisporum* which are both rapid cellulose digesters; the bacteria strains *Ruminococcus flavefaciens* a yellow gram positive streptococcus and Bacteriodes Succinogenes both of which can be found and isolated from the fecal excrement of ruminant animals; the species *Escherichia coli* which can be found and isolated from the fecal excrement of man, animals, and also in soil, and other species or kinds of bacteria.

It is an object of the invention to provide a culture that is used to inoculate the mixture of fresh cow manure, fresh water, nutrients and nutrient producing media to produce a rich liquid composition which is introduced into a water solution into which certain strains of plant organisms are then introduced to complete a culture having valuable properties when used in the treatment of animal wastes, sewage, and waste waters and also resulting in development of beneficial by-products, co-products and other uses beneficial to mankind.

It is an object of the present invention to provide a material produced by the method of the present invention which when applied to raw sewage, reduces the sulfides substantially along with the coliform bacterial count, and it also tends to aid the flocculation and settling of the solids in the solution. The reduction of the sulfide count further results in the reduction of the odors associated with sewage.

It is another object of the invention to provide a process by which can be produced a food supplement for cattle and other domesticated animals.

It is another object of the invention to provide a process to produce a liquid composition which can be used to treat the excrements of farm animals and fowl to produce an animal feed.

It is another object of the invention to provide a process by which can be produced economical co-products to be used as soil additives which will aid in improving the friability of the soil and have value as plant foods, in addition to improving the properties of the soil for aiding plant growth.

It is another object of the present invention to provide a process for converting excrement from cows to a substance from which a co-product useful for soil treatment and further aid plant life in use and uptake of inorganic or mineral fertilizers.

It is another object of the present invention to provide a method of producing a substance from which a co-product is produced which will improve the use of chemical or inorganic fertilizers by aiding the micro-organisms present in the soil to maintain the nutrient fractions in an available state, as opposed to the various ions being bound to a soil particle.

It is another object of the present invention to provide in the co-product derived from the present process a substance which adds materially to the microhumus portion of the soil.

It is another object of the present invention to provide a method of producing a substance which tends to accelerate the decomposition of organic matter in the soil.

It is another object of the present invention to provide a method of producing a substance which aids in water penetration and retention of the soil when irrigation practices must be followed.

It is another object of the present invention to provide a process for producing a substance that can be used in the partial decomposition of manures to reduce their odor in a relatively short period of time, as distinguished from the relatively long period of time ordinarily required for this result to be accomplished.

It is yet another object of the present invention to provide a process for producing a substance which when given to feeder and dairy cattle in their drinking water or as a feed additive tends to increase the weight of the cattle on reduced feed quantities.

It is also an object of the present invention to provide a process or method using fresh cow manure, fresh water and introducing specially cultured inoculant containing certain strains of cellulose digesting bacteria mainly of the aerobic faculative types found in the Order Eubacteriales to produce a rich liquid composition which is then introduced into a water solution into which certain strains of plant organisms are introduced to complete the culture.

Other objects and advantageous features of the invention will be apparent from the description and claims.

BRIEF DESCRIPTION OF THE DRAWING

The nature and characteristic features of the invention will be more readily understood from the following description taken in connection with the accompanying drawing which shows a flow diagram illustrating the invention.

It should, of course, be understood that the description and drawing herein are illustrative merely and that various modifications and changes can be made in the methods and components disclosed without departing from the spirit of the invention.

DESCRIPTION OF THE PREFERRED
EMBODIMENTS

A specially cultured inoculant is prepared containing certain strains of cellulose digesting bacteria, mainly of the aerobic faculative types found in the Order Eubacteriales to produce a rich liquid composition which is then introduced into a water solution into which certain strains of plant organisms are introduced to complete the culture. This inoculant is prepared as follows:

The first two bacteria, *Cellulobacillus myxogenes* and *Cellulobacillus mucosis* and their related species are initially streaked out and isolated on agar plates. These plates contain a cellulose extract. The cellulose extract and agar preparation can be obtained from various commercial sources such as Difco Laboratories, of Detroit, Mich. After the bacteria have been isolated and identified they are then transferred from the isolation and identification plates to another series of agar plates containing the cellulose extract in increasing concentrations. The initial procedure uses fifteen different concentrating steps. Starting from a cellulose extract concentration that is the equivalent of the concentration employed for the isolation and identification procedures, the subsequent steps are carried out in ascending concentrations, increasing the cellulose extract concentration by a factor of ½ gram on the second step, 1¼ gm. on the third step, 2 gm. on the fourth step, and doubling to a series total of fifteen consecutive increases in cellulose extract concentration. Employing the above described culturing technique using selective nutrient media is a distinctive part of the present invention whereby only those micro-organisms capable of metabolizing and utilizing the increasing concentrations of nutrient can survive. At this stage they are faculative aerobic bacteria.

A sample of these bacterial colonies is now taken from the final agar plates on which they have been grown. This sample is added to a quantity of liquid culturing media consisting of distilled water and the same concentration cellulose extract as was originally used for the initial agar plate identification procedure. This liquid media is also fortified with a liquid yeast extract, which may be obtained from dried brewer's yeast such as that manufactured by the E. R. Squibb Pharmaceutical Co., New Brunswick, N.J. A simple water-solid combination is now mixed using approximately 3 gm. yeast to 10 ml. of water. The paste formed is filtered off. The liquid fraction is added in the proportion of 1 ml., to 100 ml. of the liquid culture media. The yeast extract is added to provide amino acids and carbohydrates and in general the vitamins to stimulate the growth and reproduction of the bacteria in the liquid culture. A reaction here takes place that brings about the faculative qualities or properties of these two species, changing their metabolic process from an aerobic to an anaerobic state.

Both of the above mentioned species are spore formers, which enables their being preserved in the dry state for extended periods of time, however, dehydration must take place as soon as the genetic mutation takes place. This is signified by the transition from aerobic to anaerobic metabolism. Dehydration must take place in a cool room where the relative humidity is maintained in the 40% to 60% range. The present process is carried out by spreading the liquid media on petri dishes and placing the dishes in a cool area of the laboratory where it is preferably dark. Within a period of 4 to 10 days evaporation will take place leaving a powdery residue which contains a quantity of the spores produced by these two bacterial species.

The results of the limited research in connection with the present process indicates either the spore regeneration method just described or continuous liquid media transfer described first is satisfactory for regeneration of the two species, and both methods have been used. While exhaustive research has not been conducted to determine the relative importance of these two particular species of bacteria as the primary source of enzyme production, indications are that none of the observed and desirable reactions catalyzed by the finished product take place unless these two species are introduced in the initial stage and cultured as described above. While popular theory from current research stated that extracellular enzyme production is very limited in the cellulose digesting bacteria and published data search to date states that it is necessary for the bacteria to be in intimate contact with the fibrils or the cellulose containing material for any digestion or reduction to take place, research connected with the present process has indicated that the selective nutrient media culturing process as described above will genetically mutate these bacteria such a way that an extracellular enzyme is formed which can be extracted under certain conditions. The criteria for determining whether this enzyme production has taken place and in what quantity can be found through a standard procedure of enzyme analysis. This procedure was performed in connection with the present process and it was determined definitely that there was an extracellular enzyme produced in sufficient quantities to be of significance.

The species that will next be described which are used in the present process are anaerobic spore formers of the Clostridia group, *Cl. lochheadii* and another *Cl. longisporum.* Both of these species are capable of rapid cellulose degradation. Other species of bacteria related to the two first described are present and produce similar results in the present process. These are known as non-spore formers and are of the Cellulomonas group. They are peritrichously flagellated and can be identified and isolated from cellulose in decomposing sewage and plant life.

The previous four spore forming and single non-spore forming species described constitute the major species present and used in the process as now constituted.

Other strains which are in the present process are primarily coccoid bacteria, the first of which is *Ruminococcus flavefaciens,* a yellow gram positive, streptococcus. Another species employed is *Bacteroides succinogenes.* These strains are found and isolated from the fecal excretions of ruminant animals.

One other important strain employed in the process is the specie *Escherichia coli.* The specie may be found in the intestines of man and animals, and in the soil, it is very prolific and has no principal habitat.

The *E. coli* micro-organism is not added to any of the others in solution until all have been taken through the last stage of the adaptation process which would be the equivalent of the manure water, manure, and yeast mixture in the production stage. All of the before mentioned species are taken through a series of enrichment and plating techniques as previously described using terminal dilution to isolate, identify and establish the final culture in each case. In each case the liquid culture finally develops an anaerobic condition in which the bacteria will live.

A manure water extract is now made fortified with an 0.1% yeast extract while stirring manure in water, filtering the same to obtain a relatively clear solution. This solution can also be obtained by centrifugation. All of the aforementioned species are now introduced into the liquid media and incubated at 20 degrees C. for a period of five days. The container for the initial stage must be of sufficient volume to allow for the culture volume to be doubled each two day period by the addition of distilled water in equal volume. This allows the bacterial sufficient room to grow during the five day incubation period without producing toxic over population effects. The inoculant solution now may be refrigerated and maintained in controlled storage as a master culture for a period of 90 to 120 days without any detrimental effects.

The volume of inoculant solution is increased in size sufficiently to start full scale production. To continue direct to full scale production, the inoculant solution is now added to a larger volume of manure, water and yeast mixture using a five gallon container. Similar proportions of manure, water and yeast are used, all as combined in the first full scale production or digestion phase as hereinafter described. This solution is allowed to further grow for a period of 4 to 6 days, after which it is transferred to a larger container of approximately 50 gallons. This mixture is allowed to grow and interact in this container for a period of 10 to 14 days, after which the entire solution may be added to a larger container of full production size such as first zone 1000 gallon culturing tanks 10.

The first or digestion phase will now be described.

One or more of the 1000 gallon production culturing vats 10 in the first zone or phase is filled halfway with a fresh water-manure mixture using 30 gallons of fresh manure from lactating cows and adding approximately 3 lbs. of brewer's yeast to 1000 gallon capacity of each container 10. At this point all of the inoculant solution from the before mentioned fifty gallon container is added to each container 10, stirred in, or agitated to mix it thoroughly with the 500 gallon mixture in the first zone container 10. The container or the production vat 10 is then filled to its 1000 gallon capacity adding only fresh water to the mixture. The entire solution is then allowed to stand for a period of 7 to 14 days, depending upon the ambient temperature and, in general, conditions in the immediate area which in turn determine the temperature of the culturing solution. The prime temperature at which the production vats 10 should be maintained has been found to be an important factor in maintaining an optimum first zone or digestion phase. Introduction of an external heating element with a control to maintain the temperature between 27 degrees C. and 37 degrees C. with optimum point at 32 degrees C. is the best method of control.

In some circumstances such as in hot arid climates where exposed tanks 10 may be employed, it may prove necessary to insulate and cool the tanks and solution to maintain the optimum 32 degrees C. A 30% solution of sodium chloride in a volume of approximately 10% of the total volume of the mixture is added to the batch in each of the tanks 10 and the mixture is agitated or stirred to assure wide dissolution of the salt solution. The total mixture is then allowed to digest in the container 10 for a period of 7 to 21 days. During this period the bacteria will adjust and grow showing signs of prolific reproduction, the optimum time for this growth being approximately 14 days. The hydrogen ion concentration at this point will be seen to be between pH 5 to pH 8 with a pH of 6.5 being preferred.

Thereafter, the fluid mixture is skimmed to remove floating particles from the very top of hte first zone tanks 10. Approximately 30% to 50% of the upper portion or supernatant of the first zone tanks 10 fluid or mixture being treated is then drawn off into the second 1000 gallon tanks 11 in the second or fermentation phase, where additional time is allowed for the fermentation phase to be completed. Filtration equipment is included but may or may not be used in filter 12 between the first and second zones as required. Thereafter, the portion of fluid that is drawn off from the tanks 11 in the second zone not to exceed 50% is introduced to third and larger zone pools 14 where it is inoculated with the appropriate species of algae with an additional amount of water being added to it. This, the final mixture of fluid composition, is allowed to culture for a period of time in the third zone or open vessels or ponds 14 to produce the composition used for treatment of animal wastes, sewage, waste waters and other uses beneficial to mankind. The primary function of the third zone of the process is one of bio-oxidation. The third stage process is one where certain amounts of the second zone or phase material is added to a quantity of water. This solution is then inoculated with the algal cells and allowed to culture out. In this culturing out process, the principal function of the prolific algal bloom or growth of the algal cells is to oxidize the extraneous organic material present and to split certain molecular bonds present in the structure of the enzyme molecules, rendering them and converting them to a functional state.

The species used are primarily of the Chlorella line and this is the only type used as an inoculant per se. The third stage culture is by no means a pure culture nor is it ever intended to be or tried to be maintained as such. Several and various species may be found in the third culture at any time with a predominance given to the Chlorella family.

Nutrients for the algal growth are supplied as a "by product" of the bacterial growth in the manure water solution and fortified or adjusted by the addition of the compounds and chemicals as listed in the table following. Various other objects and advantages of the present invention will be readily apparent from the following description of the invention.

The method of the present invention is carried out by first collecting manure from lactating dairy cattle and diluting it with water in a zone or container 10 that may be of any size or shape, depending on the amount of processed material desired. The solution should be prevented from contact with unprotected steel due to the corrosive properties of the materials combined in first zone or stage of the process. After the mixture is placed in the container 10, an inoculant as earlier described and consisting of various strains of cellulose digesting bacteria is introduced into the containers 10. These bacteria may be isolated and cultured as described earlier, or obtained from well known commercial sources such as the American Type Culture Collection in Rockville, Md. A suitable amount of these organisms are introduced into the solution along with a source of vitamins, and essential amino acids, which are all found in the proper quantities in brewer's yeast as added. Also, a volume of 3% NaCl (Sodium Chloride) solution comprising 10% of the total volume of first zone tanks 10 is added in the first zone. Most of the cellulose digesting bacteria which are needed for the proper functioning of the process are usually present in sufficient quantities in the freshly collected manure of lactating dairy cattle. However, as distinctly described earlier some species should be prepared using the enrichment and plating techniques to insure obtaining the proper culture.

The mixture or solution is then stirred together and then allowed to quietly interact for a period of 7 to 21 days. During this period the cellulose digesting bacteria has time to adapt to the new environment, and after the necessary metabolic adjustments have been made as to pH, osmotic concentration, nutrient availability, etc., they grow and function. In their function they are in intimate association with the cellulose, digesting the soluble portions of the cellulose and metabolizing them into their own composition. It will be noted that while these digested portions of the cellulose were in the cellulose, they were relatively insoluble. However, because of the enzymatic digestion of them into the bacterial cell, their basic biochemical structure is altered to the point where upon the death and subsequent deterioration of the bacterial cell, they will enter the solution as a soluble organic compound. Thus, the whole digestive process functions as a biochemical change of portions of the cellulose from an insoluble organic form to a soluble organic form, which is brought about by the various species of bacteria in the solution. As the cellulose is digested and partially decomposed by the bacteria, i.e., as the soluble portions are extracted by the bacteria, it becomes less dense than the surrounding media and thus rises to the top of the container. This light fraction or residue is skimmed off daily but it may be skimmed off at any regular peirod, the preferred being each time the fresh charge of manure and water is added to the first zone tank 10. Before transfer of the zone one supernatant to the second zone tanks 11 and when enough of the fresh make-up manure-water solution is pumped into the tanks 10, these solids will rise and can be made to overflow into a chute and any suitable means then provided for the purpose of further disposal. The digested solids in the bottom of the tanks 10 may rise of their own accord or they may require some agitation of some sort to dislodge them. Slight agitation at the time the manure-water make-up is added will again introduce the settled solids into the digestive process.

In conjunction with the digestive action of the bacteria, there is also a fermentative action taking place on the liquid phase of the material at this time. This reaction takes place on the soluble portions of the cellulose and manure that has already entered into the solution.

From the combined reaction taking place in the mixture, a solution is produced that is entirely suitable to support the propagation of the certain plant organisms in the third or last zone containers or pools 14.

After these reactions have taken place in this first zone or digestive phase or stage of the method of the present invention, a separate, aqueous phase or supernatant portion forms in the upper half or 50% of the tank. Approximately all of this portion may be drawn off, filtered if necessary, and stored and/or accumulated in another or second zone for a fermentative process which then takes place. The material from the second zone is then drawn off, preferably the upper portion, or supernatant, in the amount of 50% but not to exceed 50% of the container and stored for subsequent use, or introduced directly into the third stage or the final plant organism culturing phase of the entire process. It must be noted here that the separate aqueous portions or concentrates that are drawn off from the first zone tanks and the second zone mixture contain many essential enzymes, and enzyme systems that are temperature sensitive. It will be noted that the temperature of this material should be maintained safely below a maximum of 40 degrees C. since at this temperature many of the existent enzymes and enzyme systems are inactivated.

The concentrate from the second zone is now discharged to the final culturing zone or third stage where it is imxed with from 1 to 10 (up to 1 to 20) parts by volume with fresh water. The container or its liner are preferably made of polyethylene. This mixture is then inoculated with certain strains of algae that are highly desirable. These micro-organisms may generally after a time be propagated from the concentrate solution by itself, but with an inoculation of the required plant organisms the propagation is insured. The pH factor at this stage should be held between 5.5 and 9.5 as outside limits. To this concentrate is added a special compounded solution containing all of the essential inorganic salts and trace elements that these organisms are known to require. All of the essential organic compounds are supplied by the concentrate material developed from the first zone digestion. Also, some of these same inorganic salts may be present. This solution removes any deficiencies that may be present and it stimulates the growth and propagation of microorganisms to a great extent. A complete list and quantities of the salts used are included in the following tables.

TABLES OF NUTRIENT SOLUTIONS ADDED
AT THIRD STAGE

[Quantities are in grams/liter]

|  | (1) | (2) | (3) |
|---|---|---|---|
| Media A: |  |  |  |
| $MgSO_4 \cdot 7H_2O$ | 0.25 | 0.20 | 0.3 |
| $KH_2PO_4$ | 1.0 | 1.0 | 0.1 |
| $Na_2CO_3$ | 1.50 | 1.50 |  |
| $Ca(NO_3)_2 \cdot 4H_2O$ | 0.025 | 0.025 | 0.020 |
| $NH_4NO_3$ | 0.050 | 0.30 | 0.025 |
| $KNO_3$ | 1.0 | 1.05 | 1.10 |
| Fe (citrate) | 0.006 | 0.006 | 0.001 |
| $(NH_4)_2SO_4$ |  | 0.05 | 0.15 |
| $CaCl_2$ | 0.04 | 0.04 | 0.15 |
| Media B: |  |  |  |
| $K_2HPO$ | 1.0 |  |  |
| $KH_2PO_4$ | 0.10 |  |  |
| $NH_3NO_3$ | 0.30 |  |  |
| $MgSO_4 \cdot 7H_2O$ | 0.30 |  |  |
| $CaCl_2$ | 0.040 |  |  |
| $FeCl_3$ | 0.010 |  |  |
| $H_3BO_3$ | 0.10 |  |  |
| $ZnSO_4 \cdot 7H_2O$ | 0.10 |  |  |

In the top table indicated as Media A, the three columns of quantities (1, 2, and 3) represent in the first column the most widely used or standard media and also the modifications (second and third columns) that may be required to give the optimum nutritional needs of the culture. The second column of ingredients represents the media used if the culture shows signs of under-stimulation and slow reproduction. The third column is a modification for a diet situation where the algae cells show an excessive lipid content.

The color indication by the culture is a readily available means for the determination as to the physiological condition of the cell. If there is any doubt as to the exact condition of the cell, a well-known bio-assay may be made for an exact determination.

These nutrient media may be varied from time to time as new experimentation reveals the best constituency desired. However, the media will always be a small variation at most from the quantities given here and the compounds herein will remain the same with only the quantities varying.

Some care must be taken in the production of the media in that certain of the salts if not taken into solution at a certain temperature or dilution will recombine with others and form an insoluble precipitate. This is always accompanied by a cloudiness in the solution. The solubility constants of the compounds are well known as contained in standard tables in any chemical handbook.

These nutrient solutions are introduced into the final culturing tank 14 or third stage depending upon the amount of material to be used from that particular container.

I claim:

1. A process of producing organically rich media containing certain strains of micro-organisms having properties useful in the treatment of human and animal wastes and waste water comprising
   in a first zone diluting fresh manure from cows with fresh water, the manure being equal to approximately 3% by volume,
   digesting the same at a temperature in the range from 27 to 37 degrees centigrade for at least ten days,
   introducing an inoculant containing certain strains of cellulose digesting bacteria sufficient to cause the reproductive growth of said bacteria,
   adding brewer's yeast to the mixture sufficient to cause propagation of the yeast plant
   adding a solution of sodium chloride to the mixture,
   stirring to effect an intimate mixture then allowing the mixture to stand and digest for seven to twenty-one days at a temperature in the range from 27 to 37 degrees centigrade;
   drawing off supernatant and transferring the same to a second zone for fermentation,
   drawing off supernatant from the second zone to a third zone,
   introducing algae principally of the division chlorophycophta and the genus chlorella and,
   after culturing the algae withdrawing the liquid material for use.

2. The method of claim 1 wherein certain of the said bacteria are obtained using selective nutrient media and terminal dilution to obtain the proper culture.

3. The method of claim 1 wherein certain of said bacteria are obtained from the excrement from lactating cows.

4. The method of claim 1 wherein said sodium chloride solution comprises approximately a 3% solution of sodium chloride.

5. The method of claim 1 wherein said mixture is maintained at a temperature while in the second zone at approximately 32 degrees C. and below 40 degrees C.

6. The method of claim 1 wherein the supernatant extracted from the first zone is approximately the upper 30% to 50% by volume.

7. The method of claim 1 wherein after fermentation in the second zone not more than 50% by volume of supernatant is transferred from the second to the third zone.

8. The method of claim 1 wherein the supernatant portion after fermentation in the second zone is mixed with additional water in the ratio of 1 part of said supernatant portion with 10 to 20 parts by volume of said additional water.

9. The method of claim 1 wherein
   algae and nutrients are added to said supernatant portion after said additional water is added thereto, and said mixture is allowed to culture for approximately seven days.

10. The method of claim 1 wherein the pH in the first zone is in the range from 5.0 to 8.0.

11. The method of claim 1 wherein the temperature in the second zone is maintained in the range from 30 degrees C. to 32 degrees C.

12. The method of claim 1 wherein the temperature in the third zone is maintained in the range from 10 degrees C. to 30 degrees C.

13. The method of claim 1 wherein the pH in the third zone is in the range from 5.5 to 9.5.

References Cited

UNITED STATES PATENTS

| 3,108,868 | 10/1963 | Wade | 71—21 |
| 3,219,576 | 11/1965 | Makabe | 71—9 X |
| 3,431,675 | 3/1969 | Moore | 71—9 X |
| 2,908,113 | 10/1959 | Martin | 71—21 X |
| 2,879,151 | 3/1959 | Melville | 71—1 X |

SAMIH N. ZAHARNA, Primary Examiner

R. BARNES, Assistant Examiner

U.S. Cl. X.R.

47—1.4, 58; 71—21